United States Patent
Aybay et al.

(10) Patent No.: US 10,020,888 B1
(45) Date of Patent: Jul. 10, 2018

(54) TRANSMITTER AND RECEIVER FOR DIRECT COMMUNICATION OF MULTIPLE OPTICAL WAVELENGTHS VIA AN OPTICAL LINK

(71) Applicant: Juniper Networks, Inc., Sunnyvale, CA (US)

(72) Inventors: Gunes Aybay, Cupertino, CA (US); Valery Kugel, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 564 days.

(21) Appl. No.: 14/227,468

(22) Filed: Mar. 27, 2014

(51) Int. Cl.
| | |
|---|---|
| H04B 10/12 | (2006.01) |
| H04B 10/2581 | (2013.01) |
| H04J 14/02 | (2006.01) |
| H04B 10/516 | (2013.01) |
| H04B 10/572 | (2013.01) |
| G02B 6/42 | (2006.01) |

(52) U.S. Cl.
CPC ....... *H04B 10/2581* (2013.01); *G02B 6/4215* (2013.01); *G02B 6/4295* (2013.01); *H04B 10/516* (2013.01); *H04B 10/572* (2013.01); *H04J 14/02* (2013.01)

(58) Field of Classification Search
None
See application file for complete search history.

(56) References Cited

U.S. PATENT DOCUMENTS

| | | | |
|---|---|---|---|
| 6,195,485 B1 * | 2/2001 | Coldren | G02B 6/4202 385/49 |
| 6,271,943 B1 * | 8/2001 | Goossen | B82Y 20/00 257/E31.033 |
| 8,488,921 B2 | 7/2013 | Doany et al. | |

(Continued)

FOREIGN PATENT DOCUMENTS

EP    2 365 654    9/2011

OTHER PUBLICATIONS

Wikipedia, "Fiber-optic Communication", http:en.wikipedia.org/wiki/Fiber-optic_communication, Mar. 14, 2014, 12 pages.

(Continued)

*Primary Examiner* — Ken N Vanderpuye
*Assistant Examiner* — David Lambert
(74) *Attorney, Agent, or Firm* — Harrity & Harrity, LLP

(57) ABSTRACT

An optical transmitter may generate a first optical signal having a first wavelength and a second optical signal having a second wavelength. The optical transmitter may output the first and second optical signals to a link without performing a multiplexing operation. The optical transmitter may output part of the first optical signal to the link while part of the second optical signal is being output to the link. An optical receiver may receive the first and second optical signals, via the link, as separate optical signals. The optical receiver may receive part of the first optical signal from the link while part of the second optical signal is being received from the link. The optical receiver may provide the first and second optical signals to a photodetector array that includes a first photo- (Continued)

detector to detect the first optical signal and a second photodetector to detect the second optical signal.

20 Claims, 10 Drawing Sheets

(56) References Cited

U.S. PATENT DOCUMENTS

| | | | | |
|---|---|---|---|---|
| 2006/0045158 A1* | 3/2006 | Li | ............ | H01S 5/4043 372/50.12 |
| 2013/0272665 A1* | 10/2013 | Lim | ............ | G02B 6/3628 385/92 |
| 2015/0071638 A1* | 3/2015 | Heroux | ............ | H04B 10/2504 398/79 |

OTHER PUBLICATIONS

Foveon, Inc., "Direct Image Sensors", http://www.foveon.net/article.php?a=67, Apr. 4, 2004, 2 pages.

Jim Hayes, "Guide to Fiber Optics and Premises Cabling" http://www.thefoa.org/tech/wavelength.htm, Apr. 1, 2002, 3 pages.

* cited by examiner

TRANSMITTER AND RECEIVER FOR DIRECT COMMUNICATION OF MULTIPLE OPTICAL WAVELENGTHS VIA AN OPTICAL LINK

BACKGROUND

Fiber-optic communication is a mechanism for transmitting information from one place to another by sending pulses of light through an optical fiber. The light forms an electromagnetic carrier wave that may be modulated to carry information. Because of advantages over electrical transmission, optical fibers have largely replaced copper wire communications in core networks. Optical fiber is used by many telecommunications companies to transmit telephone signals, Internet communication, and cable television signals. The process of communicating using fiber-optics involves the following basic steps: creating the optical signal using a transmitter, relaying the signal along a fiber, ensuring that the signal does not become too distorted or weak, receiving the optical signal using a receiver, and converting the optical signal into an electrical signal to determine information carried via the optical signal.

SUMMARY

According to some possible implementations, a system may include an optical transmitter. The optical transmitter may include a first transmitter component and a second transmitter component. The first transmitter component may generate a first optical signal having a first wavelength, may modulate the first optical signal to form a first modulated optical signal having the first wavelength, and may output the first modulated optical signal to an optical link, for transmission to an optical receiver, without multiplexing the first modulated optical signal and a second modulated optical signal having a second wavelength that is different than the first wavelength. The second transmitter component may generate a second optical signal having the second wavelength, may modulate the second optical signal to form the second modulated optical signal having the second wavelength, and may output the second modulated optical signal to the optical link, for transmission to the optical receiver, without multiplexing the second modulated optical signal and the first modulated optical signal. A portion of the second modulated optical signal may be output to the optical link by the second transmitter component while a portion of the first modulated optical signal is being output to the optical link by the first transmitter component.

According to some possible implementations, a system may include an optical receiver. The optical receiver may receive, from an optical transmitter and via an optical link, a first optical signal having a first wavelength, and may receive, from the optical transmitter and via the optical link, a second optical signal having a second wavelength. The second wavelength may be different from the first wavelength. The first optical signal and the second optical signal may be received via the optical link as separate optical signals that are not multiplexed by the optical transmitter. A portion of the second optical signal may be received from the optical link while a portion of the first optical signal is being received from the optical link. The optical receiver may provide the first optical signal and the second optical signal to a photodetector array that includes a first photodetector and a second photodetector to independently and respectively detect and process the first optical signal and the second optical signal.

According to some possible implementations, a system may include an optical transmitter and an optical receiver. The optical transmitter may generate a first optical signal having a first wavelength, and may generate a second optical signal having a second wavelength. The second wavelength may be different from the first wavelength. The optical transmitter may output the first optical signal and the second optical signal to an optical link without performing a multiplexing operation. A portion of the first optical signal may be output to the optical link by the optical transmitter while a portion of the second optical signal is being output to the optical link by the optical transmitter. The optical receiver may receive the first optical signal and the second optical signal from the optical transmitter, via the optical link, as separate optical signals. A portion of the first optical signal may be received from the optical link by the optical receiver while a portion of the second optical signal is being received from the optical link by the optical receiver. The optical receiver may provide the first optical signal and the second optical signal to a photodetector array, that includes a first photodetector to detect the first optical signal, and a second photodetector to detect the second optical signal. The second photodetector may be different than the first photodetector.

DETAILED DESCRIPTION

The following detailed description of example implementations refers to the accompanying drawings. The same reference numbers in different drawings may identify the same or similar elements.

Wavelength division multiplexing (WDM) may be used to communicate information over long distances. Using WDM, an optical transmitter may generate and modulate multiple optical signals of different wavelengths. The optical transmitter may use a multiplexer to combine the multiple optical signals into a single optical signal to be transmitted via a single optical fiber. Upon reaching an optical receiver, the incoming optical signal may be split into the original signals of multiple wavelengths using a demultiplexer, and the multiple signals may be provided to different photodetectors assigned to receive information on respective wavelengths.

Within a network device, such as a switch or a router, an electrical backplane is often used to transfer information from one component to another (e.g., via a bus). However, scaling an electrical backplane to handle a high volume of information is becoming increasingly difficult due to physical constraints. To handle increased throughput, network devices may use an optical backplane where signals between components (e.g., line cards, fabric cards, etc.) are carried via a fiber or a waveguide. However, an optical backplane solution may be expensive, and may face different physical constraints than an electrical backplane. In particular, an optical backplane may face density and space constraints for interconnections between active components, such as lasers or photodetectors, and passive components, such as fibers, waveguides, or optical connectors. Implementations described herein may reduce the cost and complexity of interconnections between such active optical components and passive optical components by, for example, reducing the total number of fibers, waveguides, or optical connectors, and by eliminating multiplexers and demultiplexers at the interconnections.

Figure 1:
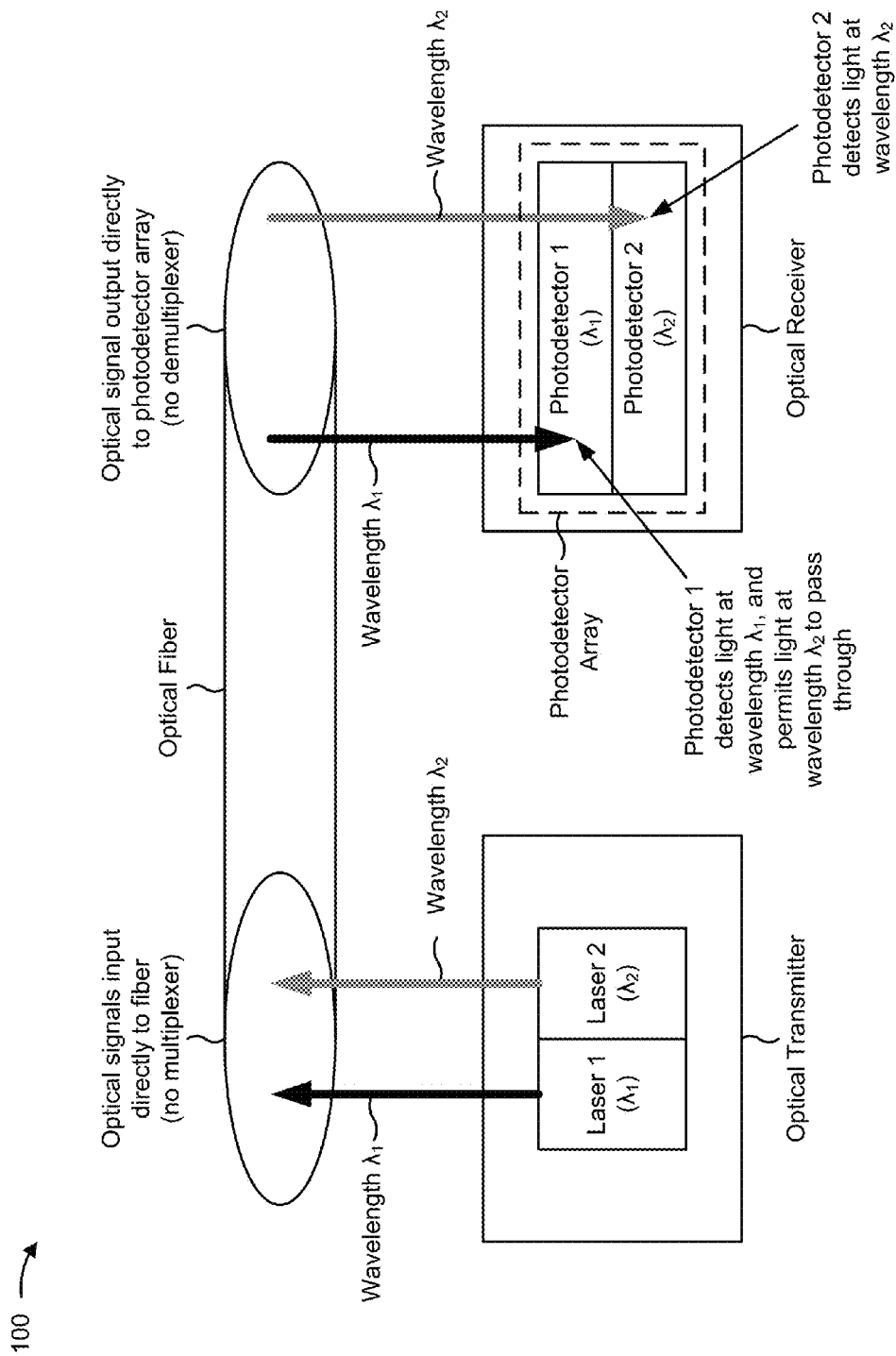
FIG. 1 is a diagram of an overview of an example implementation described herein.

FIG. 1 is a diagram of an overview of an example implementation 100 described herein. As shown in FIG. 1, an optical transmitter may include multiple lasers, shown as Laser 1 and Laser 2, that generate optical signals at different wavelengths, shown as $\lambda_1$ and $\lambda_2$. The optical signals (which may be modulated) may be output from the lasers directly into a fiber without being multiplexed into a single optical signal via a multiplexer or a coupler. The multiple optical signals may travel through the fiber to an optical receiver, where the optical signals may be received directly by a photodetector array without being demultiplexed (e.g., by a demultiplexer or a decoupler) from a single optical signal to multiple optical signals.

As shown, the photodetector array may include multiple photodetectors, shown as Photodetector 1 and Photodetector 2, that detect (and/or absorb) optical signals at different wavelengths, shown as $\lambda_1$ and $\lambda_2$. The photodetectors may be arranged such that a photodetector that detects shorter wavelength (e.g., higher energy) light receives the optical signal from the fiber before a photodetector that detects longer wavelength (e.g., lower energy) light. For example, assume that $\lambda_1$ is a shorter wavelength than $\lambda_2$. As shown, Photodetector 1, which is positioned closer to the optical fiber than Photodetector 2, detects light at wavelength $\lambda_1$, while allowing light at wavelength $\lambda_2$ to pass through to Photodetector 2. Photodetector 2 detects light at wavelength $\lambda_2$. By constructing interconnections between optical transmitters and optical receivers in this manner (e.g., by eliminating multiplexers and demultiplexers), the cost and complexity of transmitting optical signals over short distances (e.g., within a chassis, within a network device, between components of a backplane of a network device) may be reduced.

Figure 2:
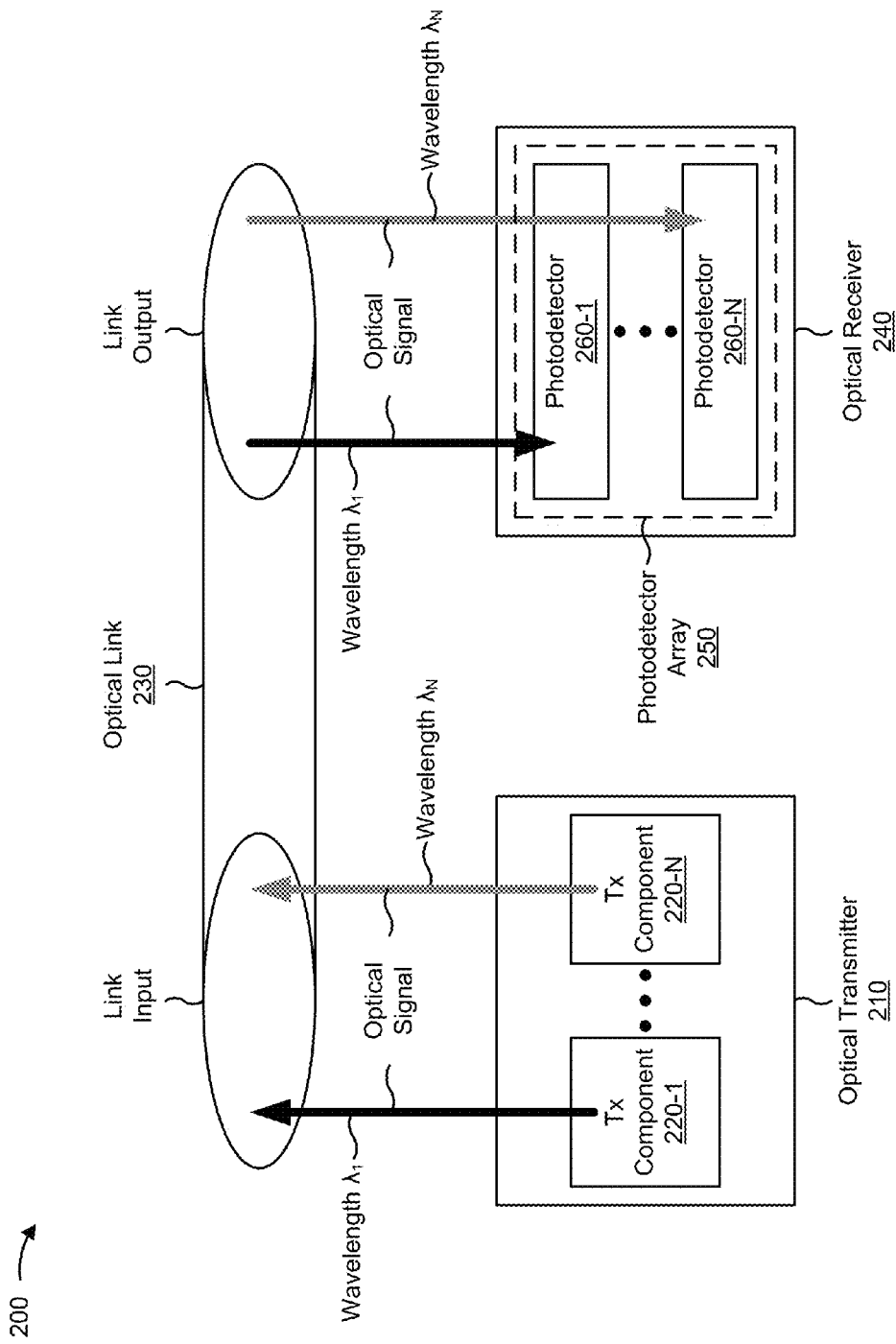
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an optical transmitter 210, which may include two or more transmitter (Tx) components 220-1 through 220-N (N≥2) (hereinafter referred to collectively as "Tx components 220," and individually as "Tx component 220"). As further shown in FIG. 2, environment 200 may include an optical link 230 and an optical receiver 240, which may include a photodetector array 250. Photodetector array 250 may include two or more photodetectors 260-1 through 260-N (N≥2) (hereinafter referred to collectively as "photodetectors 260," and individually as "photodetector 260").

Optical transmitter 210 may include one or more devices configured to receive data for transmission via optical link 230, to modulate the data onto an optical signal to create a modulated optical signal, and to transmit the modulated optical signal via optical link 230. Optical transmitter 210 may include multiple Tx components 220 configured to generate an optical signal, modulate the optical signal using a modulator, and provide the modulated optical signal to optical link 230. Different Tx components 220 may be configured to generate optical signals at different wavelengths. Tx component 220 may be directly coupled (e.g., using one or more lenses) to optical link 230 (e.g., a fiber core) via a link input, such that optical signals output from multiple Tx components 220 are not multiplexed together (e.g., by a multiplexer) before being provided to optical link 230 for transmission.

As shown, Tx components 220-1 through 220-N may generate optical signals at wavelengths $\lambda_1$ through $\lambda_N$, respectively. For example, a particular Tx component 220 may be configured to generate optical signals at a particular wavelength, with a particular spectral separation from a wavelength generated by another Tx component 220. A wavelength at which Tx component 220 generates an optical signal may depend on a type of optical link 230 via which the optical signal is to be transmitted (e.g., a single-mode fiber, a multi-mode fiber, a plastic optical fiber, etc.).

In some implementations, optical signals transmitted via a multi-mode fiber may range in wavelength from 850 nanometers (nm) to 1300 nm. As an example, when two optical signals, of different wavelengths, are to be transmitted via a multi-mode fiber, a first Tx component 220 may generate an optical signal with a wavelength of 850 nm, and a second Tx component 220 may generate an optical signal with a wavelength of 1300 nm.

In some implementations, optical signals transmitted via a single-mode fiber may range in wavelength from 1300 (or 1310) nm to 1550 nm. As an example, when two optical signals, of different wavelengths, are to be transmitted via a single-mode fiber, a first Tx component 220 may generate an optical signal with a wavelength of 1310 nm, and a second Tx component 220 may generate an optical signal with a wavelength of 1550 nm.

In some implementations, optical signals transmitted via a plastic optical fiber may range in wavelength from 850 nm to 1060 nm. As an example, when two optical signals, of different wavelengths, are to be transmitted via a plastic optical fiber, a first Tx component 220 may generate an optical signal with a wavelength of 850 nm, and a second Tx component 220 may generate an optical signal with a wavelength of 1060 nm.

The wavelengths described above with respect to a multi-mode fiber, a single-mode fiber, and a plastic optical fiber may reduce an amount of loss (e.g., due to noise) experienced by the optical signals when transmitted via the respective fibers. These wavelengths are provided as examples, and Tx components 220 may be configured to provide optical signals at other wavelengths (e.g., for two, three, four, or more optical signals with different wavelengths) when transmitting the optical signals via a multi-mode fiber, a single-mode fiber, a plastic optical fiber, etc. In some implementations, the wavelengths may be selected such that the wavelengths are evenly spaced across a range of wavelengths used in connection with a particular fiber type (e.g., a multi-mode fiber, a single-mode fiber, a plastic optical fiber, etc.).

Optical link 230 may include a link for transmitting optical signals from optical transmitter 210 to optical receiver 240. For example, optical link 230 may include an optical fiber (e.g., a single-mode fiber, a multi-mode fiber, a plastic optical fiber, etc.), a waveguide, or the like. Optical link 230 may concurrently transport two or more optical signals associated with different wavelengths. For example, multiple Tx components 220 may concurrently provide portions of respective optical signals to optical link 230, and optical link 230 may concurrently receive (e.g., via a link input) portions of the multiple optical signals from different Tx components 220, without the multiple optical signals being multiplexed together to form a single optical signal. Furthermore, optical link 230 may concurrently provide (e.g., via a link output) portions of multiple optical signals to photodetector array 250, without using a demultiplexer to form the multiple optical signals (e.g., from a single optical signal). In some implementations, optical signals carried via optical link 230 may be amplified by an amplifier, such as a doped fiber amplifier, a Raman amplifier, etc. In some implementations, a length of optical link 230 may be approximately one meter or less.

Optical receiver 240 may include one or more devices configured to receive input optical signals (e.g., transmitted by optical transmitter 210 via optical link 230) and to recover data carried via the optical signals as output data (e.g., by converting the optical signals to voltage signals, converting the voltage signals to digital samples, and processing the digital samples to produce output data corresponding to the input optical signals). Optical receiver 240 may include a photodetector array 250 to receive optical signals via optical link 230.

Photodetector array 250 may include two or more photodetectors 260 arranged in a particular manner. Photodetector array 250 may be directly coupled (e.g., using one or more lenses) to optical link 230 (e.g., a fiber core) via a link output, such that optical signals received from optical link 230 are not demultiplexed (e.g., by a demultiplexer) before being provided to photodetector array 250.

Photodetector 260 may include a photodetector, such as a narrow-band photodetector, a photodiode, a phototransistor, or a similar device. In some implementations, photodetector 260 may be configured to detect an optical signal of a particular wavelength or a range of wavelengths (e.g., a range of wavelengths centered around a particular wavelength).

In some implementations, photodetectors 260 may be arranged such that optical signals, received from optical link 230, are first received by a first photodetector 260. First photodetector 260 may be configured to detect optical signals at a first wavelength or energy level (e.g., a shorter wavelength, or a higher energy level), and pass optical signals at a second wavelength or energy level (e.g., a longer wavelength, or a lower energy level) to a second photodetector 260 configured to detect optical signals at the second wavelength or energy level. For example, the first photodetector 260 may be positioned closer to a link output of optical link 230 than the second photodetector 260. The first photodetector 260 may permit optical signals at the second wavelength to pass through to the second photodetector 260.

Where more than two photodetectors 260 are used (e.g., when more than two wavelengths of optical signals are transmitted by optical transmitter 210), the set of photodetectors 260 may be arranged sequentially such that an optical signal is successively received by photodetectors 260 that detect longer wavelengths (e.g., lower energy levels) of optical signals. In some implementations, photodetectors 260 may be arranged in a vertical stack (e.g., where optical link 230 provides optical signals from above or below the stack). Additionally, or alternatively, photodetectors 260 may be arranged in a horizontal stack (e.g., where optical link 230 provides optical signals from either side of the stack). In these cases, a photodetector 260 that detects the shortest wavelength (e.g., as compared to the other photodetectors 260 in the stack) may be positioned closest to a link output of optical link 230 (e.g., as compared to the other photodetectors 260), a photodetector 260 that detects a next-shortest wavelength may be positioned next-closest to the link output, etc., and a photodetector 260 that detect a longest wavelength may be positioned furthest from the link output.

In some implementations, photodetector 260 may receive multiple optical signals, having different wavelengths, may absorb an optical signal having a shortest wavelength, and may not absorb the remaining optical signals having longer wavelengths, causing the remaining optical signals to be passed through to another photodetector 260 (e.g., the next photodetector 260 in a stack). Additionally, or alternatively, each photodetector 260 in the stack may receive all or a subset of the optical signals (e.g., having different wavelengths), and a particular photodetector 260 may detect only those optical signals that have a particular wavelength that the particular photodetector 260 is configured to detect.

As shown, photodetectors 260-1 through 260-N may detect optical signals at wavelengths $\lambda_1$ through $\lambda_N$, respectively, which may correspond to the wavelengths of the optical signals generated by Tx components 220-1 through 220-N. For example, a particular photodetector 260 may be configured to detect optical signals at a particular wavelength corresponding to a wavelength of an optical signal generated by a corresponding Tx component 220, with a particular spectral separation from a wavelength detected by another photodetector 260. A wavelength at which photodetector 260 detects an optical signal may depend on a type of optical link 230 via which the optical signal is to be transmitted (e.g., a single-mode fiber, a multi-mode fiber, a plastic optical fiber, etc.), as described above in connection with Tx component 220.

The number and arrangement of devices and components shown in FIG. 2 is provided as an example. In practice, there may be additional devices and/or components, fewer devices and/or components, different devices and/or components, or differently arranged devices and/or components than those shown in FIG. 2. Furthermore, two or more devices and/or components shown in FIG. 2 may be implemented within a single device and/or component, or a single device and/or component shown in FIG. 2 may be implemented as multiple, distributed devices and/or components. Additionally, or alternatively, a set of devices/components (e.g., one or more devices/components) of environment 200 may perform one or more functions described as being performed by another set of devices/components of environment 200.

Figure 3A:
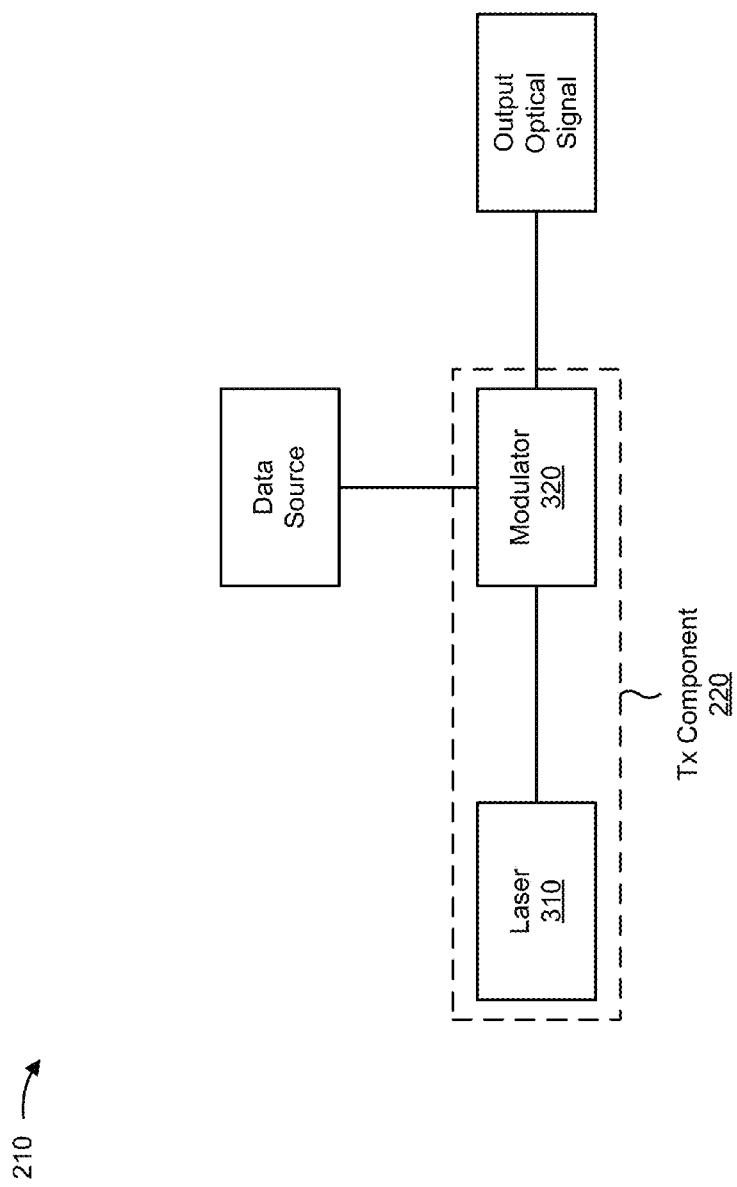
FIGS. 3A and 3B are diagrams of example components of one or more devices of FIG. 2.

FIG. 3A is a diagram of example components of optical transmitter 210. As shown in FIG. 3A, optical transmitter 210 may include Tx component 220, which may include a laser 310 and a modulator 320.

Laser 310 may include a semiconductor laser (e.g., a laser diode), such as a vertical laser (e.g., a vertical cavity surface-emitting laser (VCSEL), etc.) that emits a laser beam perpendicular to a boundary between semiconductor layers of a semiconductor used to generate a laser beam, a horizontal laser (e.g., an edge-emitting laser, etc.) that emits a laser beam parallel to a boundary between semiconductor layers of a semiconductor used to generate a laser beam, or the like. Laser 310 may provide an output optical light beam to modulator 320.

Modulator 320 may include an optical modulator, such as a Mach-Zehnder modulator (MZM), a nested MZM, or another type of modulator. Modulator 320 may receive the optical light beam from laser 310, may receive voltage signals from a data source (e.g., which may be received from a digital-to-analog converter that converts a digital signal, received from a digital signal processor, to an analog signal), and may modulate the optical light beam, based on the voltage signals, to generate an output optical signal. Tx component 220 (e.g., laser 310 and/or modulator 320) may provide the output optical signal to optical receiver 240 via optical link 230. Multiple modulators 320, included in multiple Tx components 220, may provide respective output optical signals to optical receiver 240 via optical link 230 without the output optical signals being multiplexed together. In some implementations, laser 320 may be directly modulated.

The number and arrangement of components shown in FIG. 3A is provided as an example. In practice, optical transmitter 210 may include additional components, fewer components, different components, or differently arranged components than those shown in FIG. 3A. Additionally, or alternatively, a set of components (e.g., one or more components) of optical transmitter 210 may perform one or more functions described as being performed by another set of components of optical transmitter 210.

Figure 3B:
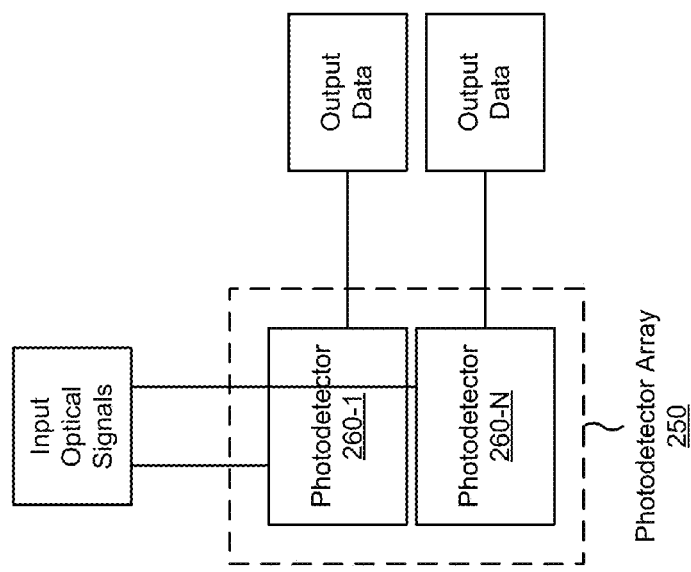

FIG. 3B is a diagram of example components of optical receiver 240. As shown in FIG. 3B, optical receiver 240 may include a photodetector array 250, which may include two or more photodetectors 260.

Photodetector array 250 may include two or more photodetectors 260 arranged in a particular manner, as described elsewhere herein. Photodetectors 260 may receive input optical signals (e.g., from optical transmitter 210 and via optical link 230), may detect an input optical signal corresponding to a particular wavelength or range of wavelengths, and may provide the detected signal to another component (e.g., an analog-to-digital converter and/or a digital signal processor) for processing to determine output data. Multiple photodetectors 260, included in photodetector array 250, may receive input optical signals from optical link 230 without the input optical signals being demultiplexed to form the multiple portions.

The number and arrangement of components shown in FIG. 3B is provided as an example. In practice, optical receiver 240 may include additional components, fewer components, different components, or differently arranged components than those shown in FIG. 3B. Additionally, or alternatively, a set of components (e.g., one or more components) of optical receiver 240 may perform one or more functions described as being performed by another set of components of optical receiver 240.

Figure 4A:
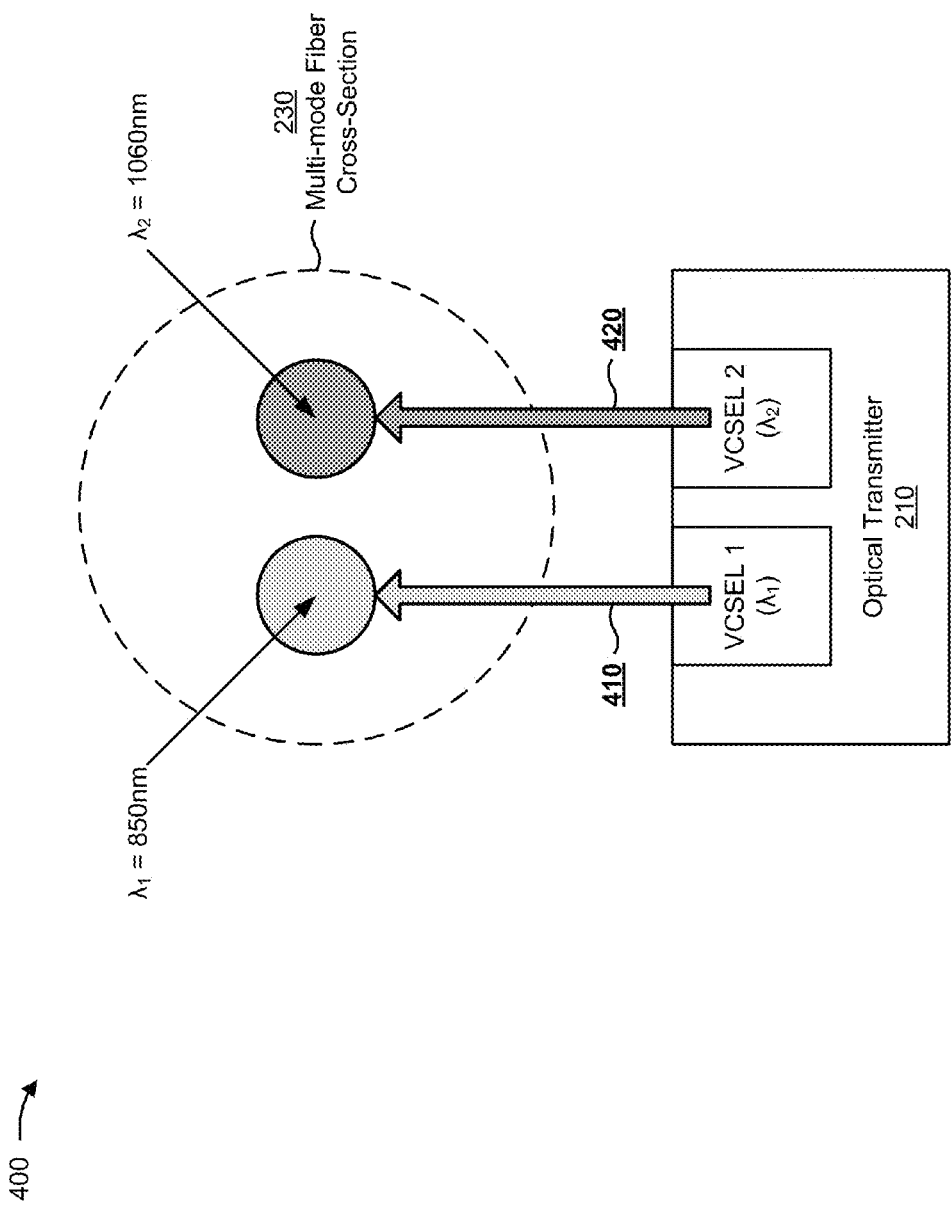
FIGS. 4A and 4B are diagrams of an example implementation relating to operations performed by one or more devices of FIG. 2.
Figure 4B:
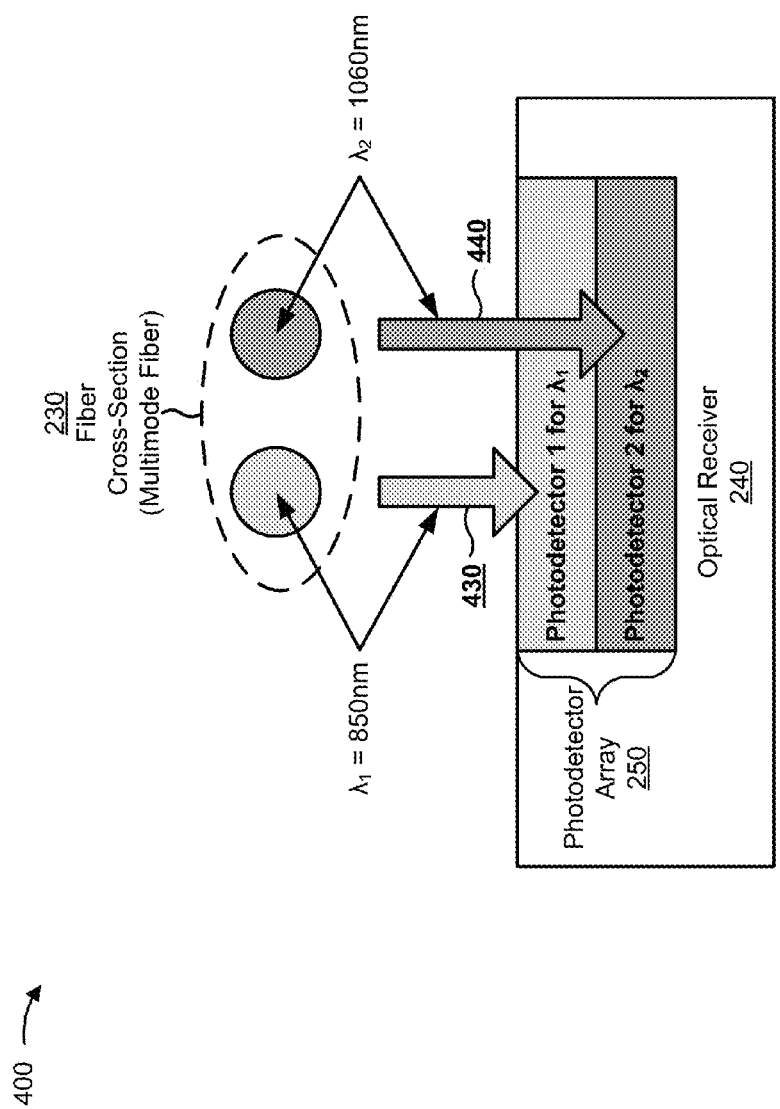

FIGS. 4A and 4B are diagrams of an example implementation 400 relating to operations performed by one or more devices of FIG. 2. FIGS. 4A and 4B show an example of concurrently transmitting two optical signals, of different wavelengths, via optical link 230 without multiplexing the two optical signals together.

As shown in FIG. 4A, and by reference number 410, assume that a first VCSEL, shown as VCSEL 1, generates a first optical signal at a first wavelength, shown as $\lambda_1$, equal to 850 nanometers (nm). As shown by reference number 420, assume that a second VCSEL, shown as VCSEL 2, generates a second optical signal at a second wavelength, shown as $\lambda_2$, equal to 1060 nm. Assume that VCSEL 1 and VCSEL 2 provide separate optical signals (e.g., which may be modulated by a single modulator 320 or multiple modulators 320), which are concurrently provided as input to optical link 230 without being multiplexed together. While shown as being spatially separated inside optical link 230, the first optical signal and the second optical signal may overlap within optical link 230 (e.g., to improve coupling efficiency and/or to reduce noise).

In example implementation 400, assume that optical link 230 is a multi-mode fiber. The diameter of a VCSEL (e.g., approximately 10 micrometers) is typically smaller than the diameter of a multi-mode fiber core (e.g., approximately 50 micrometers). In some implementations, a lens or a lens system may be positioned between VCSEL 1 and VCSEL 2 (and/or between the VCSELs and optical link 230) to align light from both VCSELs with respect to an axis of optical link 230. Thus, multiple VCSELs may be placed in a footprint of the multi-mode fiber core such that multiple optical signals of different wavelengths may be input directly into the multi-mode fiber core, eliminating the need for a multiplexer to combine the multiple optical signals for transmission via the multi-mode fiber.

As shown in FIG. 4B, assume that the optical signals travel through optical link 230 to optical receiver 240, where the optical signals are provided from optical link 230 to photodetector array 250 without being demultiplexed. Assume that photodetector array 250 includes a first photodetector 260, shown as Photodetector 1, and a second photodetector 260, shown as Photodetector 2.

As shown by reference number 430, assume that Photodetector 1 detects the first optical signal (e.g., detects light at wavelength $\lambda_1$=850 nm). As shown by reference number 440, assume that Photodetector 1 permits the second optical signal to pass through to Photodetector 2, which detects the second optical signal (e.g., detects light at wavelength $\lambda_2$=1060 nm).

As another example, Photodetectors 1 and 2 may both receive the first and second optical signals. In this case, Photodetector 1 may be configured to detect the first optical signal (and not the second optical signal), and Photodetector 2 may be configured to detect the second optical signal (and not the first optical signal).

Assume that Photodetectors 1 and 2 transmit information, included in the respective optical signals, to other components of optical receiver 240 to be decoded. In this way, a high volume of information may be transmitted from optical transmitter 210 to optical receiver 240 without constraints introduced by complex optical interconnections (e.g., multiplexers, demultiplexers, etc.).

As indicated above, FIGS. 4A and 4B are provided merely as an example. Other examples are possible and may differ from what was described with regard to FIGS. 4A and 4B. For example, optical transmitter 210 and/or optical receiver 240 may perform additional operations, fewer operations, or different operations than those described in connection with FIGS. 4A and 4B. Additionally, or alternatively, while photodetectors 260 are shown as arranged in a vertical stack, photodetectors 260 may be arranged in a different manner (e.g., a horizontal stack).

Figure 5A:
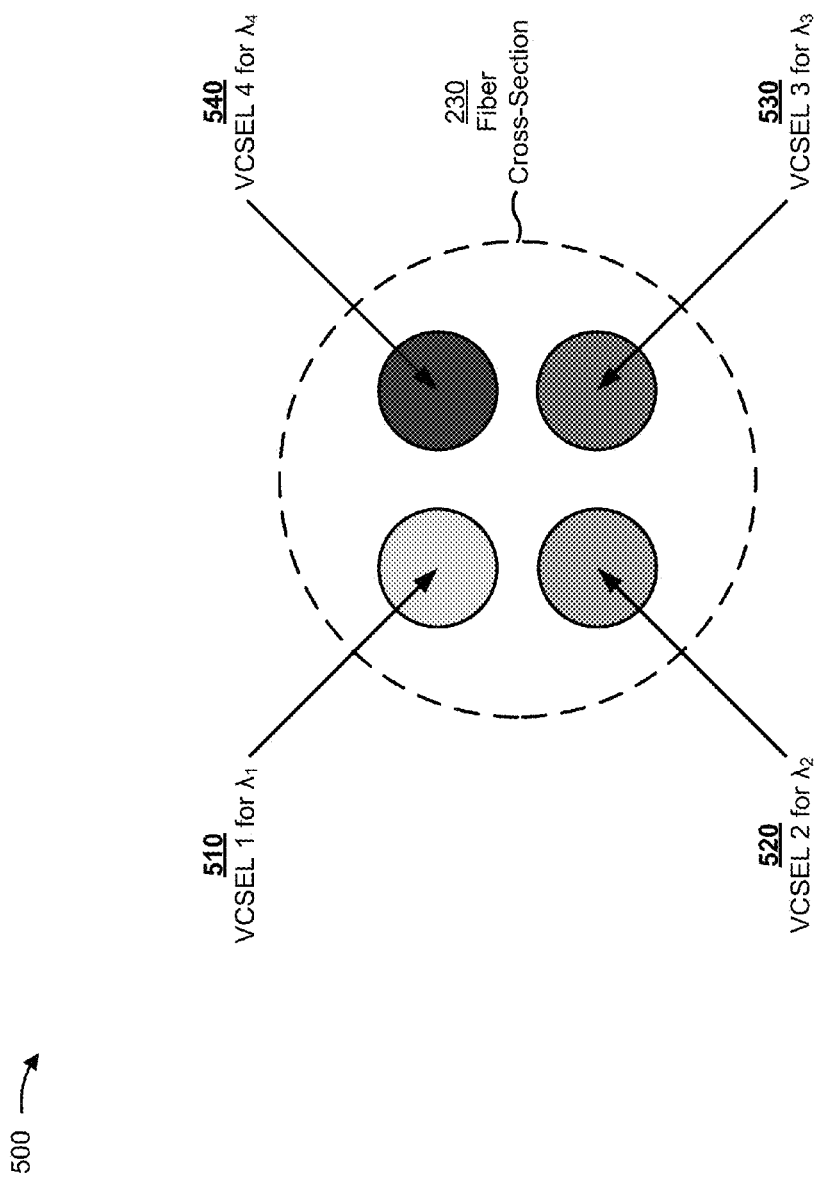
FIGS. 5A and 5B are diagrams of another example implementation relating to operations performed by one or more devices of FIG. 2.
Figure 5B:
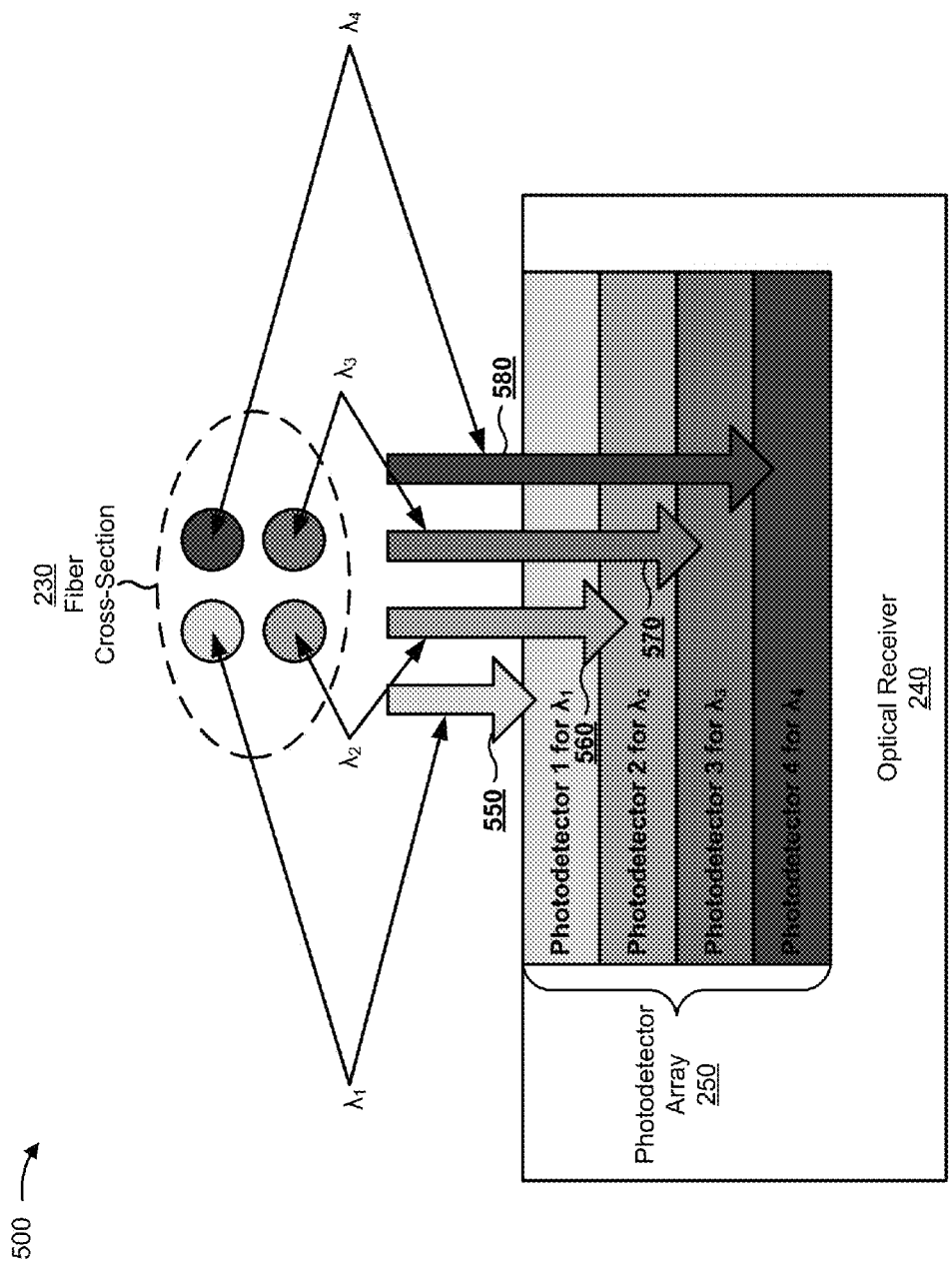

FIGS. 5A and 5B are diagrams of an example implementation 500 relating to operations performed by one or more devices of FIG. 2. FIGS. 5A and 5B show an example of concurrently transmitting four optical signals, of different wavelengths, via optical link 230 without multiplexing the four optical signals together.

As shown in FIG. 5A, and by reference number 510, assume that a first VCSEL, shown as VCSEL 1, generates a first optical signal at a first wavelength, shown as $\lambda_1$ (e.g., equal to 850 nm). As shown by reference number 520, assume that a second VCSEL, shown as VCSEL 2, generates a second optical signal at a second wavelength, shown as $\lambda_2$ (e.g., equal to 1000 nm). As shown by reference number 530, assume that a third VCSEL, shown as VCSEL 3, generates a third optical signal at a third wavelength, shown as $\lambda_3$ (e.g., equal to 1150 nm). As shown by reference number 540, assume that a fourth VCSEL, shown as VCSEL 4, generates a fourth optical signal at a fourth wavelength, shown as $\lambda_4$ (e.g., equal to 1300 nm). Assume that VCSEL 1, VCSEL 2, VCSEL 3, and VCSEL 4 concurrently provide separate optical signals (e.g., which may be modulated by a single modulator 320 or multiple modulators 320), which are provided as input to optical link 230 without being multiplexed together.

While shown as being spatially separated inside optical link 230, the first optical signal, the second optical signal, the third optical signal, and/or the fourth optical signal may overlap within optical link 230 (e.g., to improve coupling efficiency and/or to reduce noise).

As shown in FIG. 5B, assume that the optical signals travel through optical link 230 to optical receiver 240, where the optical signals are provided from optical link 230 to photodetector array 250 without being demultiplexed. Assume that photodetector array 250 includes a first photodetector 260, shown as Photodetector 1, a second photodetector 260, shown as Photodetector 2, a third photodetector 260, shown as Photodetector 3, and a fourth photodetector 260, shown as Photodetector 4.

As shown by reference number 550, assume that Photodetector 1 detects the first optical signal at wavelength $\lambda_1$. Further, assume that Photodetector 1 permits the second, third, and fourth optical signals to pass through to Photodetector 2. As shown by reference number 560, assume that Photodetector 2 detects the second optical signal at wavelength $\lambda_2$. Further, assume that Photodetector 2 permits the third and fourth optical signals to pass through to Photodetector 3. As shown by reference number 570, assume that Photodetector 3 detects the third optical signal at wavelength $\lambda_3$. Further, assume that Photodetector 3 permits the fourth optical signal to pass through to Photodetector 4. As shown by reference number 580, assume that Photodetector 4 detects the fourth optical signal at wavelength $\lambda_4$. Assume that Photodetectors 1, 2, 3, and 4 transmit information, included in the respective optical signals, to other components of optical receiver 240 to be decoded.

As another example, Photodetectors 1, 2, 3, and 4 may each receive all four optical signals (or more than one optical signal). In this case, Photodetector 1 may be configured to detect the first optical signal (and not the second, third, or fourth optical signal); Photodetector 2 may be configured to detect the second optical signal (and not the first, third, or fourth optical signal); Photodetector 3 may be configured to detect the third optical signal (and not the first, second, or fourth optical signal); and Photodetector 4 may be configured to detect the fourth optical signal (and not the first, second, or third optical signal).

As indicated above, FIGS. 5A and 5B are provided merely as an example. Other examples are possible and may differ from what was described with regard to FIGS. 5A and 5B. For example, optical transmitter 210 and/or optical receiver 240 may perform additional operations, fewer operations, or different operations than those described in connection with FIGS. 5A and 5B.

While FIGS. 4A and 4B show an example of transmitting two optical signals, of different wavelengths, via optical link 230, and FIGS. 5A and 5B show an example of transmitting four optical signals, of different wavelengths, via optical link 230, in some implementations, a different number of optical signals, of different wavelengths, may be transmitted via optical link 230. For example, optical transmitter 210 and optical receiver 240 may be configured to transmit and receive, via optical link 230, three optical signals of different wavelengths, five optical signals of different wavelengths, etc.

Figure 6:
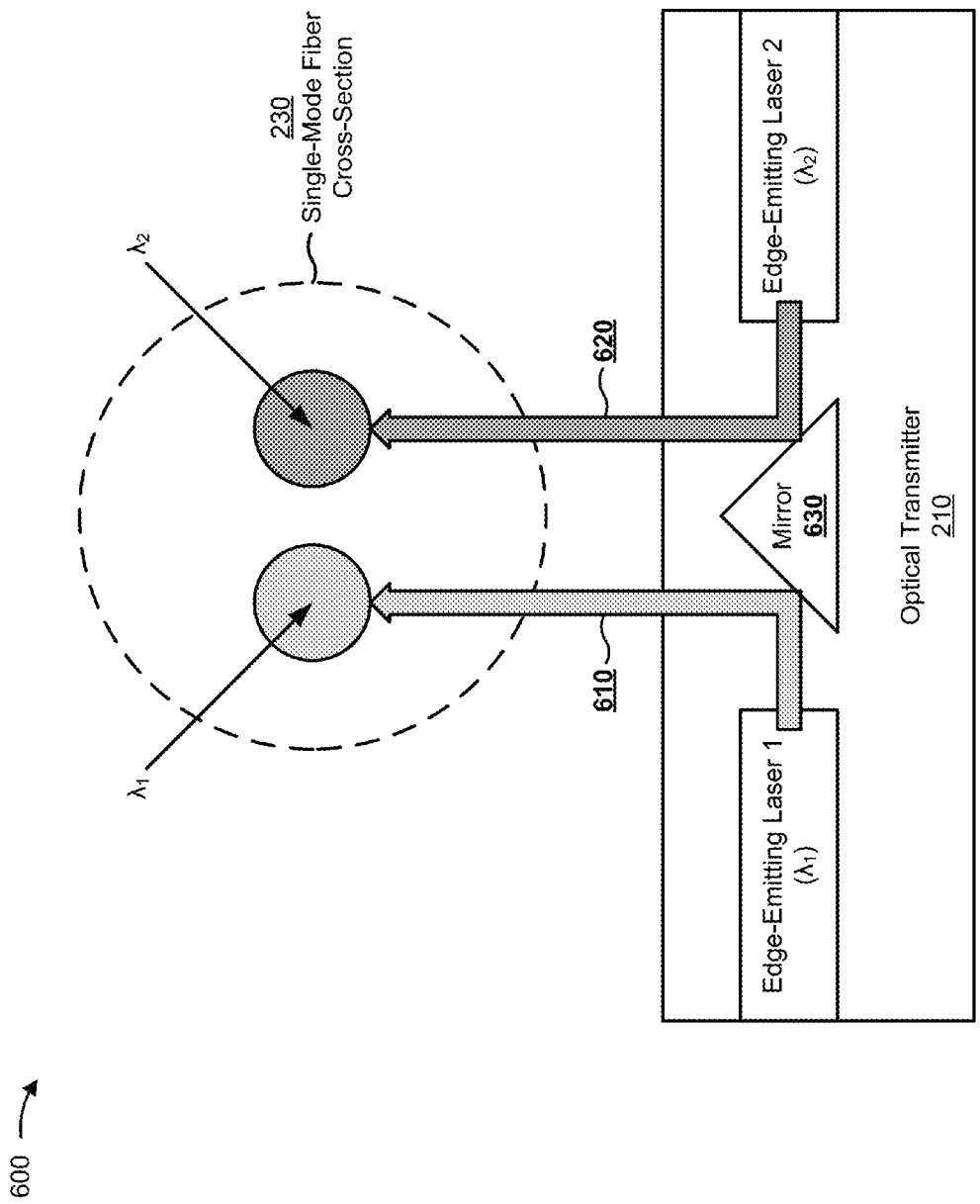
FIG. 6 is a diagram of another example implementation relating to operations performed by one or more devices of FIG. 2.

FIG. 6 is a diagram of an example implementation 600 relating to operations performed by one or more devices of FIG. 2. FIG. 6 shows a side view of using two horizontal lasers (e.g., edge-emitting lasers) to concurrently transmit two optical signals, of different wavelengths, via optical link 230 without multiplexing the two optical signals together.

As shown in FIG. 6, and by reference number 610, assume that a first horizontal laser, shown as Edge-Emitting Laser 1 (EEL 1), generates a first optical signal at a first wavelength, shown as $\lambda_1$ (e.g., equal to 1310 nm). As shown by reference number 620, assume that a second horizontal laser, shown as Edge-Emitting Laser 2 (EEL 2), generates a second optical signal at a second wavelength, shown as $\lambda_2$ (e.g., equal to 1550 nm). As shown by reference number 630, assume that the EEL 1 and EEL 2 concurrently provide separate optical signals (e.g., which may be modulated by a single modulator 320 or multiple modulators 320), which are guided to optical link 230 (e.g., a fiber core) using one or more mirrors. Assume that the separate optical signals are concurrently provided as input to optical link 230 without being multiplexed together. While shown as being spatially separated inside optical link 230, the first optical signal and the second optical signal may overlap within optical link 230, in some implementations.

In example implementation 600, assume that optical link 230 is a single-mode fiber. The diameter of a single-mode fiber core (e.g., approximately 10 micrometers) is typically smaller than the diameter of a multi-mode fiber core (e.g., approximately 50 micrometers). Thus, it may be difficult to place multiple VCSELs (e.g., with a diameter of approximately 10 micrometers) in a footprint of the single-mode fiber core. By using a mirror, as shown, optical transmitter 210 may focus optical signals from multiple EELs into the single-mode fiber core. In this way, optical transmitter 210 may use multiple horizontal lasers to concurrently provide respective optical signals, of different wavelengths, to optical receiver 240 via optical link 230.

As indicated above, FIG. 6 is provided merely as an example. Other examples are possible and may differ from what was described with regard to FIG. 6. For example, optical transmitter 210 may perform additional operations, fewer operations, or different operations than those described in connection with FIG. 6.

Figure 7:
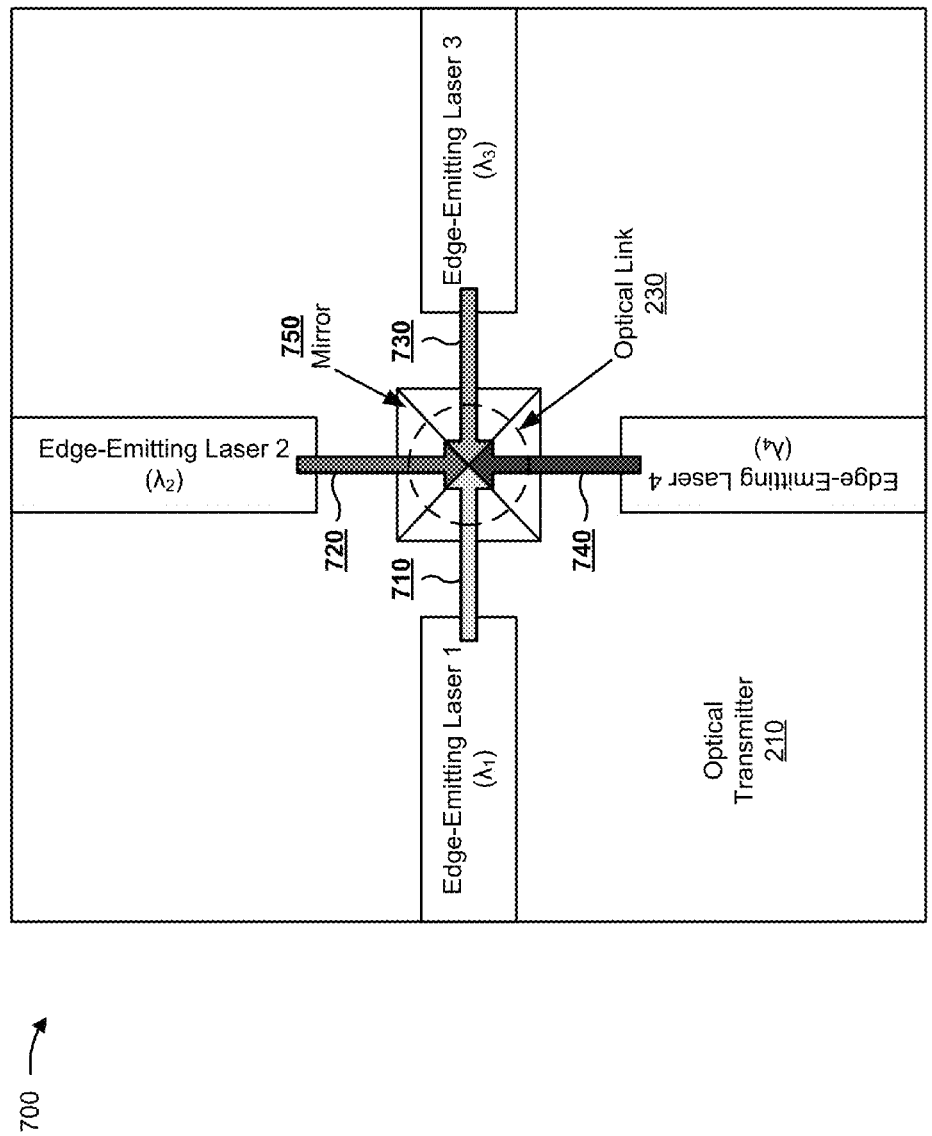
FIG. 7 is a diagram of another example implementation relating to operations performed by one or more devices of FIG. 2.

FIG. 7 is a diagram of an example implementation 700 relating to operations performed by one or more devices of FIG. 2. FIG. 7 shows a top view (or a bottom view) of using four horizontal lasers (e.g., edge-emitting lasers) to concurrently transmit four optical signals, of different wavelengths, via optical link 230 without multiplexing the four optical signals together.

As shown in FIG. 7, and by reference number 710, assume that a first horizontal laser, shown as Edge-Emitting Laser 1 (EEL 1), generates a first optical signal at a first wavelength, shown as $\lambda_1$ (e.g., equal to 1310 nm). As shown by reference number 720, assume that a second horizontal laser, shown as Edge-Emitting Laser 2 (EEL 2), generates a second optical signal at a second wavelength, shown as $\lambda_2$ (e.g., equal to 1390 nm). As shown by reference number 730, assume that a third horizontal laser, shown as Edge-Emitting Laser 3 (EEL 3), generates a third optical signal at a third wavelength, shown as $\lambda_3$ (e.g., equal to 1470 nm). As shown by reference number 740, assume that a fourth horizontal laser, shown as Edge-Emitting Laser 4 (EEL 4), generates a fourth optical signal at a fourth wavelength, shown as $\lambda_1$ (e.g., equal to 1550 nm).

As shown by reference number 750, assume that the EEL 1, EEL 2, EEL 3, and EEL 4 concurrently provide separate optical signals (e.g., which may be modulated by a single modulator 320 or multiple modulators 320), which are guided to optical link 230 (e.g., a fiber core) using a mirror. Assume that the separate optical signals are concurrently provided as input to optical link 230 without being multiplexed together. In this way, optical transmitter 210 may use multiple horizontal lasers to concurrently provide respective optical signals, of different wavelengths, to optical receiver 240 via optical link 230.

As indicated above, FIG. 7 is provided merely as an example. Other examples are possible and may differ from what was described with regard to FIG. 7. For example, optical transmitter 210 may perform additional operations, fewer operations, or different operations than those described in connection with FIG. 7.

Implementations described herein provide a way to reduce the cost and complexity of optical interconnections by using an optical transmitter to directly transmit multiple optical signals into an optical link (e.g., without multiplexing the multiple optical signals), and by sequentially detecting the multiple optical signals via an array of photodetectors included in an optical receiver (e.g., without demultiplexing the multiple optical signals).

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    an optical transmitter, the optical transmitter including:
        a first transmitter component to:
            generate a first optical signal having a first wavelength;
            modulate the first optical signal to form a first modulated optical signal having the first wavelength; and
            output the first modulated optical signal to an optical link comprising a single fiber core, for transmission to an optical receiver, without multiplexing the first modulated optical signal and a second modulated optical signal having a second wavelength that is different than the first wavelength;
        a second transmitter component to:
            generate a second optical signal having the second wavelength;
            modulate the second optical signal to form the second modulated optical signal having the second wavelength; and
            output the second modulated optical signal to the optical link, for transmission to the optical receiver, without multiplexing the second modulated optical signal and the first modulated optical signal,
                at least a portion of the second modulated optical signal being output to the optical link by the second transmitter component while at least a portion of the first modulated optical signal is being output to the optical link by the first transmitter component; and
        a mirror to concurrently guide the first modulated optical signal and the second modulated optical signal, as separate optical signals, to the optical link,
            the first transmitter component being positioned horizontal in reference to a first surface of the mirror for outputting the first modulated optical signal directly to the first surface of the mirror,
            the first transmitter component being a first horizontal laser,
            the first modulated optical signal being provided directly and horizontally from the first horizontal laser to the first surface of the mirror,
            the mirror guiding the first modulated optical signal to the optical link in a manner that causes the first modulated optical signal to enter a first portion of the optical link,
            the second transmitter component being positioned horizontal in reference to a second surface of the mirror for outputting the second modulated optical signal directly to the second surface of the mirror,
            the second transmitter component being a second horizontal laser,
            the second modulated optical signal being provided directly and horizontally from the second horizontal laser to the second surface of the mirror,
            the mirror guiding the second modulated optical signal to the optical link in a manner that causes the second modulated optical signal to enter a second portion of the optical link, and
            the second portion of the optical link being different from the first portion of the optical link.

2. The system of claim 1, 
    where the first horizontal laser is a first edge-emitting laser; and
    where the second laser is a second edge-emitting laser.

3. The system of claim 1, where the single fiber core includes a single-mode fiber.

4. The system of claim 1, further comprising:
    the optical receiver,
        where the optical receiver includes:
            a first photodetector to:
                detect the first modulated optical signal having the first wavelength; and
            a second photodetector to:
                detect the second modulated optical signal having the second wavelength, the second photodetector being different from the first photodetector.

5. The system of claim 4,
where the first photodetector is further to:
  detect the first optical signal having the first wavelength; and
  permit the second optical signal, having the second wavelength, to pass through the first photodetector to the second photodetector; and
where the second photodetector is further to:
  detect the second optical signal after the second optical signal has passed through the first photodetector.

6. The system of claim 1, further comprising:
the optical receiver,
  where the optical receiver is to:
    receive the first optical signal from the optical link; and
    receive the second optical signal from the optical link,
      the first optical signal and the second optical signal being received from the optical link without performing a demultiplexing operation to form the first optical signal and the second optical signal.

7. A system comprising,
a mirror comprising:
  a first surface that is horizontal in reference to a first transmitter component for horizontal receipt and reflection of a first optical signal having a first wavelength, and
  a second surface that is horizontal in reference to a second transmitter component for horizontal receipt and reflection of a second optical signal having a second wavelength,
    the mirror being to concurrently guide the first optical signal and the second optical signal, as separate optical signals, to an optical link comprising a single fiber core,
    the first transmitter component being a first horizontal laser,
    the first optical signal being provided directly and horizontally from the first horizontal laser to the first surface of the mirror,
    the mirror guiding the first optical signal to the optical link in a manner that causes the first optical signal to enter a first portion of the optical link,
    the second transmitter component being a second horizontal laser,
    the second optical signal being provided directly and horizontally from the second horizontal laser to the second surface of the mirror,
    the mirror guiding the second optical signal to the optical link in a manner that causes the second optical signal to enter a second portion of the optical link, and
    the second portion of the optical link being different from the first portion of the optical link; and
an optical receiver to:
  receive, from an optical transmitter and via the optical link, the first optical signal having the first wavelength;
  receive, from the optical transmitter and via the optical link, the second optical signal having the second wavelength,
    the second wavelength being different from the first wavelength,
    the first optical signal and the second optical signal being received via the optical link as separate optical signals that are not multiplexed by the optical transmitter, and
    at least a portion of the second optical signal being received from the optical link while at least a portion of the first optical signal is being received from the optical link; and
  provide the first optical signal and the second optical signal to a photodetector array that includes a first photodetector and a second photodetector to independently and respectively detect and process the first optical signal and the second optical signal.

8. The system of claim 7,
where the first photodetector is to:
  detect the first optical signal having the first wavelength; and
  output first information based on detecting the first optical signal; and
where the second photodetector is to:
  detect the second optical signal having the second wavelength; and
  output second information based on detecting the second optical signal,
    the second photodetector being different from the first photodetector.

9. The system of claim 7,
where the first photodetector is to:
  detect the first optical signal having the first wavelength; and
  permit the second optical signal, having the second wavelength, to pass through the first photodetector to the second photodetector; and
where the second photodetector is to:
  detect the second optical signal after the second optical signal has passed through the first photodetector.

10. The system of claim 7,
where the first photodetector is to detect optical signals having the first wavelength;
where the second photodetector is to detect optical signals having the second wavelength; and
where the first photodetector is positioned closer to the optical link than the second photodetector.

11. The system of claim 10,
where the first photodetector and the second photodetector are positioned in a vertical stack, and
where the first photodetector is positioned closer to a top of the vertical stack than the second photodetector.

12. A system, comprising:
an optical transmitter to:
  generate a first optical signal having a first wavelength with a first transmitter component;
  generate a second optical signal having a second wavelength with a second transmitter component,
    the second wavelength being different from the first wavelength; and
  utilize a mirror to concurrently guide the first optical signal and the second optical signal, as separate optical signals, to an optical link comprising a single fiber core,
    the first transmitter component being positioned horizontal in reference to a first surface of the mirror for outputting the first optical signal directly to the first surface of the mirror,
    the first transmitter component being a first horizontal laser, the first optical signal being provided directly and horizontally from the first horizontal laser to the first surface of the mirror, the mirror guiding the first optical signal to the optical link in a manner that causes the first optical signal to enter a first portion of the optical link, the second transmitter component being positioned horizontal in reference to a second surface of the mirror for outputting the second optical signal directly to the second surface of the mirror, the second transmitter component being a second horizontal laser, the second optical signal being provided directly and horizontally from the second horizontal laser to the second surface of the mirror, the mirror guiding the second optical signal to the optical link in a manner that causes the second optical signal to enter a second portion of the optical link, the second portion of the optical link being different from the first portion of the optical link, and at least a portion of the first optical signal being output to the optical link by the optical transmitter while at least a portion of the second optical signal is being output to the optical link by the optical transmitter; and an optical receiver to:

receive the first optical signal and the second optical signal from the optical transmitter, via the optical link, as the separate optical signals, at least a portion of the first optical signal being received from the optical link by the optical receiver while at least a portion of the second optical signal is being received from the optical link by the optical receiver; and provide the first optical signal and the second optical signal to a photodetector array, that includes a first photodetector to detect the first optical signal, and a second photodetector to detect the second optical signal, the second photodetector being different than the first photodetector.

13. The system of claim 12, where the first photodetector is to:

detect the first optical signal having the first wavelength; and permit the second optical signal, having the second wavelength, to pass through the first photodetector to the second photodetector; and where the second photodetector is to:

detect the second optical signal after the second optical signal has passed through the first photodetector.

14. The system of claim 12, where the first photodetector is to:

detect optical signals having the first wavelength;

where the second photodetector is to:

detect optical signals having the second wavelength; and where the first photodetector is positioned closer to the optical link than the second photodetector, such that optical signals received via the optical link must pass through the first photodetector before reaching the second photodetector.

15. The system of claim 12, where the optical transmitter is further to:

generate a third optical signal having a third wavelength, the third wavelength being different from the first wavelength and the second wavelength; and output the third optical signal to the optical link, separate from the first optical signal and the second optical signal, at least a portion of the third optical signal being output to the optical link while at least a portion of the first optical signal and at least a portion of the second optical signal are being output to the optical link; and where the optical receiver is further to:

receive the third optical signal from the optical transmitter, via the optical link, as a separate optical signal from the first optical signal and the second optical signal, at least a portion of the third optical signal being received from the optical link while at least a portion of the first optical signal and at least a portion of the second optical signal are being received from the optical link; and provide the third optical signal to the photodetector array, the photodetector array including a third photodetector to detect the third optical signal, the third photodetector being different than the first photodetector and the second photodetector.

16. The system of claim 15, where the first photodetector is to detect optical signals having the first wavelength;

where the second photodetector is to detect optical signals having the second wavelength;

where the third photodetector is to detect optical signals having the third wavelength;

where the first photodetector is positioned closer to the optical link than the second photodetector; and where the second photodetector is positioned closer to the optical link than the third photodetector.

17. The system of claim 15, where the optical transmitter is further to:

generate the third optical signal having the third wavelength from a third transmitter component; and utilize the mirror to concurrently guide the first optical signal, the second optical signal, and the third optical signal as separate optical signals, to the optical link, the third transmitter component being positioned horizontal in reference to a third surface of the mirror for outputting the third optical signal directly to the third surface of the mirror.

18. The system of claim 12, where the first horizontal laser is a first edge-emitting laser; and where the second laser is a second edge-emitting laser.

19. The system of claim 12, where the single fiber core includes a single-mode fiber.

20. The system of claim 7, where the first horizontal laser is a first edge-emitting laser; and where the second laser is a second edge-emitting laser.

* * * * *